Figure 1:
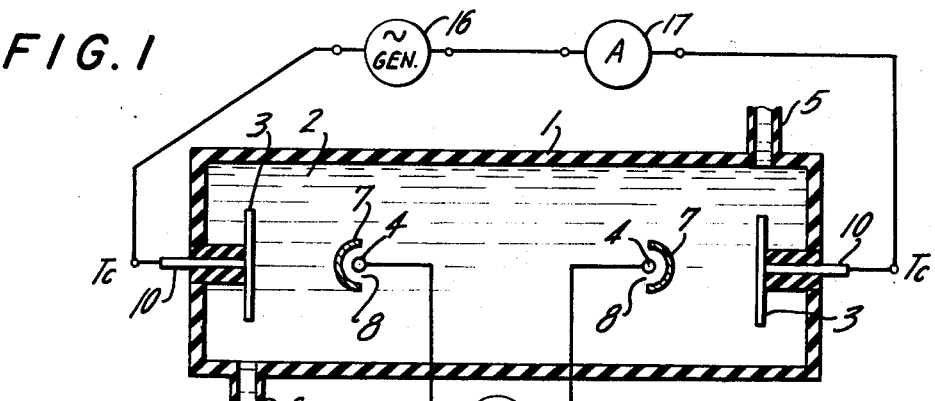

United States Patent

[11] 3,601,693

| [72] | Inventor | Jens Jorn Lorentzen<br>Bogehoj 46,, Hellerup, near Copenhagen,<br>Denmark |
|------|----------|---------------------------------------------------------------|
| [21] | Appl. No. | 811,186 |
| [22] | Filed | Mar. 27, 1969 |
| [45] | Patented | Aug. 24, 1971 |
| [32] | Priority | Aug. 30, 1965 |
| [33] | | Denmark |
| [31] | | 3667/65 |
| | | Continuation-in-part of application Ser. No. 472,857, June 19, 1965, now abandoned. |

[54] MEASURING CELL FOR MEASURING ELECTRICAL CONDUCTIVITY OF A FLUID MEDIUM
6 Claims, 7 Drawing Figs.

| [52] | U.S. Cl. | 324/30 R, 324/64 |
|------|----------|----------|
| [51] | Int. Cl. | G01n 27/42 |
| [50] | Field of Search | 324/30, 64, 29, 9, 10; 340/12 |

[56] References Cited

UNITED STATES PATENTS

| 2,778,995 | 1/1957 | Gross et al. | 324/64 |
| 2,821,680 | 1/1958 | Slusser et al. | 324/64 X |
| 2,871,446 | 1/1959 | Wann | 324/64 |
| 2,988,690 | 6/1961 | Love et al. | 324/64 X |

*Primary Examiner*—Edward E. Kubasiewicz
*Attorneys*—Robert E. Burns and Emmanuel J. Lobato ABSTRACT: A measuring cell having current electrodes and voltage electrodes, the current electrodes being serially connected to an alternating current source and a current measuring device and the voltage electrodes being connected to a voltage measuring device whereby the ratio of the measured current flow to the measured voltage is a unique value indicative of the electrolytic conductivity of the medium. Electrical insulating means are positioned adjacent the voltage electrodes to effectively bypass the current flow around the voltage electrodes thereby screening same from the current flow. The insulating means prevents contamination and polarization of the voltage electrodes by the current flow whereby an accurate current measurement and voltage measurement is obtained.

MEASURING CELL FOR MEASURING ELECTRICAL CONDUCTIVITY OF A FLUID MEDIUM

RELATED APPLICATION

This application is a continuation-in-part of my earlier U.S. Pat. application, Ser. No. 472,857, filed July 19, 1965, and now abandoned.

SUMMARY OF THE INVENTION

The invention relates to a measuring cell for measuring the conductivity of an electrolytic medium, the cell being of the kind having at least two current electrodes, which are connected to an alternating current source, and two voltage electrodes connected to a voltage measuring device which is preferably of high internal impedance in relation to the impedance of the electrolytic medium between the voltage electrodes.

Measuring cells of the aforesaid kind have to be designed in such manner that the measurement is not disturbed by polarization or contamination of the surfaces of the electrodes of the measuring cell. These drawbacks are to some extent eliminated by the use of measuring cells containing four electrodes. Between two of these electrodes, the current electrodes, the current of the cell flows through the medium, whereas the voltage characteristic of the electrolytic conductivity of the medium is measured between the two remaining electrodes, the voltage electrodes.

By removing the voltage electrodes in such measuring cells to a sufficient distance from the current electrodes, it is possible to make the measurement result independent of the primary polarization inevitably arising on the surface of the current electrodes. By further designing the measuring instrument, which measures the voltage between the voltage electrodes, with a high input resistance the measurement results may be made independent of an even rather considerable contamination of the surface of these electrodes.

Practice has shown, however, that the secondary polarization produced on the surface of the voltage electrodes involves measuring errors and renders the cell less suitable for the precision measurements required by modern industry. Investigations have established that the secondary polarization is produced because the voltage electrodes are traversed by a part of the cell current. When the current flows into or out of the voltage electrodes, it produces on the surface of these a polarization voltage which is incorporated in the measurement voltage and therefore constitutes a measuring error. Contamination of the surface of the voltage electrodes will uncontrollably concentrate the current flowing through the electrodes and thereby increase the measuring error.

It is the object of the invention to devise a measuring cell of the aforesaid kind having none of the drawbacks referred to, and a measuring cell according to the invention having two voltage electrodes disposed in such manner in relation to at least one electrically insulating body and screened by the body in such manner that the flow of electric current between the current electrodes bypasses the voltage electrodes.

As a result, the voltage electrodes are not included in the flow path of the current flowing between the current electrodes and no secondary polarization of the surfaces of the voltage electrodes is therefore produced. In consequence, the ratio between the voltage measured across the voltage electrodes (probe-electrodes) and the current measured by a current measuring device connected in series to the current electrodes is a unique value for the electrolytic conductivity of the medium. In many cases it is sufficient to obtain a relative value for the conductivity measured by comparison with a standard solution of the same elctrolyte.

For example, frequently it is difficult to calculate the conductivity knowing only the ratio between the measured values for current and voltage and the geometrical dimensions of the cell, but in such instances a cell constant, $k$, may be determined for each cell by using a fluid medium $N$ having a known specific conductivity, $\delta_N$ mho/cm., and giving measured values $I_N$ and $V_N$, then $$\delta_N = I_N/V_N \times k$$

Consequently, an unknown conductivity, $\delta_X$, corresponding to another fluid medium X, giving measured values $I_X$ and $V_X$, can be found from $$\delta_X = I_X/V_X \times K = I_X/V_X \times V_N/I_N \times \delta_N$$

The cell constant, $k$, once determined for a given cell, will be valid for determining specific conductivities for any other fluid medium using that particular cell.

In one embodiment of the measuring cell according to the invention the two voltage electrodes are inserted each in their separate recess in the electrically insulating body. The recesses have at least one aperture through which the voltage electrodes are in contact with the electrolytic medium and are arranged in such manner that the paths of electric current flow between the current electrodes bypass the recesses.

As a result, the voltage electrodes are screened from current that might produce polarization on the surfaces of the voltage electrodes.

In a preferred embodiment of the measuring electrode according to the invention the electrically insulating body is formed as a screen having formed therein a plurality of pairs of recesses in which pairs of current and voltage electrodes are disposed. The recesses which house the voltage electrodes have apertures located in a plane which forms an angle of 60—120° with the lines of electric current which, without the presence of the screen, would flow between the two current electrodes, whereby polarization of the surface of the voltage electrodes is likewise prevented.

Figure 2:
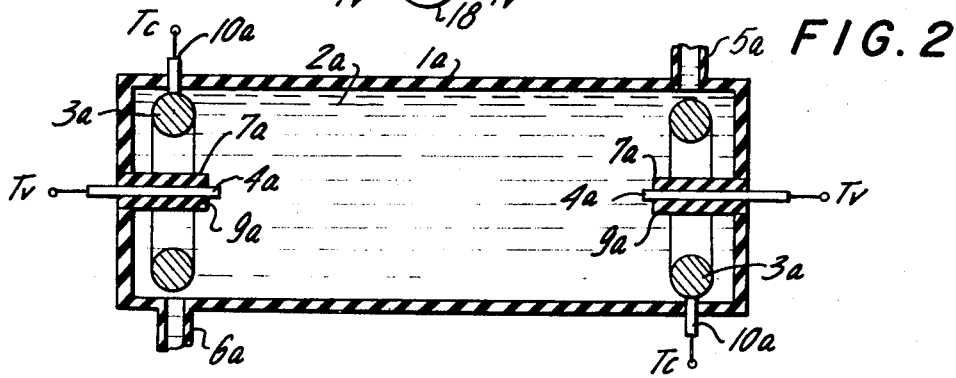

The invention will now be further described with reference to the drawing, in which:

FIGS. 1—7 show various typical embodiments of a measuring cell according to the invention, in FIGS. 1, 3—7 viewed in section at right angles to the voltage electrodes of the measuring cell and in FIG. 2 in a section through these voltage electrodes. In the various figures corresponding parts have like reference numerals with lettered postscripts to simplify understanding of the various embodiments.

The drawing shows a measuring cell apparatus consisting of a cell chamber 1 with in electrolytic medium 2 and with at least two current electrodes 3 which are connected to an alternating current source and two voltage electrodes 4 connected to a voltage measuring devise which has a high internal impedance in relation to the impedance of the electrolytic medium 2 between the voltage electrodes 4. The cell chamber 1 may be provided with an inlet pipe connection 5 and an outlet pipe connection 6 for the electrolytic medium 2.

In all of the embodiments of the measuring cell according to the invention as illustrated in FIGS. 1—7, current bypassing means in the nature of at least one electrically insulating body 7 is disposed relative to the voltage electrodes 4 such that the voltage electrodes are screened by the body in such a manner that the paths of electric current flow between the current electrodes 3 bypass the voltage electrodes 4.

In the embodiment of the measuring cell according to the invention as illustrated in FIG. 1 the wire- or rod-shaped voltage electrodes 4 are disposed with their longitudinal direction at right angles to the plane of the paper and screened from the paths of current flow between the plate-shaped current electrodes 3 each by means of its separate electrically insulating body 7 which is formed as a semicircular cylindrical screen lying substantially coaxial with the wire- or rod-shaped voltage electrodes 4 and having in aperture 8 which is facing away from the adjacent current electrode 3. The paths of electric current flow between the current electrodes constitute substantially straight lines, however, the screens 7 will force the flow of current along these lines to bypass the voltage electrodes 4 to accomplish the object of the invention. An alternating current source 16 and a current measuring device 17 are connected in series with terminals $T_c$, conductors 10 and current electrodes 3 while a voltage measuring device 18 is connected to terminals $T_v$ of voltage electrodes 4 and it is understood that such are also used in the embodiments shown in FIGS. 2—7.

In the embodiment shown in FIG. 2 wire-shaped voltage electrodes $4a$ are located in the plane of the paper, each surrounded by the electrically insulating, preferably cylindrical body $7a$, from whose end surface $9a$, which is facing the electrolytic medium, the voltage electrodes $4a$ project.

Ring-shaped current electrodes $3a$ are mounted coaxially around the voltage electrodes $4a$ and provided with feed wires $10a$. In this embodiment of the measuring cell according to the invention the flow of electric current will be substantially along the generatrices of cylindrical surfaces extending between the two ring-shaped current electrodes $3a$, and the voltage probe-electrodes $4a$ are each located in a zone in said electrolytic medium extending coaxially to the current electrodes $3a$ and in which zone the paths of the current between the current electrodes will bypass the probe-electrodes.

Figure 3:
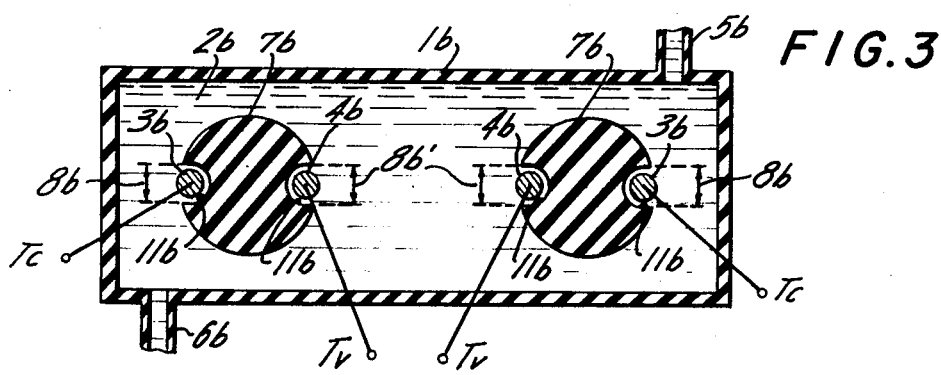

In the embodiment of the measuring cell according to the invention as shown in FIG. 3 two sets of electrodes, each consisting of a wire- or rod-shaped current electrode $3b$ and a similarly wire- or rod-shaped voltage electrode $4b$ which extends parallel with the current electrode $3b$ are inserted into diametrically located recesses $11b$ in a preferably cylindrical body $7b$ which is common for each set of electrodes and extends with its longitudinal axis at right angles to the plane of the paper so that the voltage electrodes $4b$ are located in recesses $11b$ the apertures $8b'$ of which are facing each other, whereas the current electrodes $3b$ are located in recesses $11b$ the apertures $8b$ of which are facing away from each other. In this case the paths of current flow will will extend along curved cylindrical surfaces the generatrices of which are at right angles to the plane of the paper and which are forced by the two electrically insulating bodies $7b$ to bypass these bodies and therefore cannot reach the voltage electrodes $4b$. Each of the two electrically insulating bodies $7b$ is thus acting is a screen for its respective voltage electrode, the said screen having an aperture $8b$ the plane of which forms an angle of 90° with the lines of electric current, which, without the presence of the screen $7b$, would flow between the current electrodes $3b$.

Figure 4:
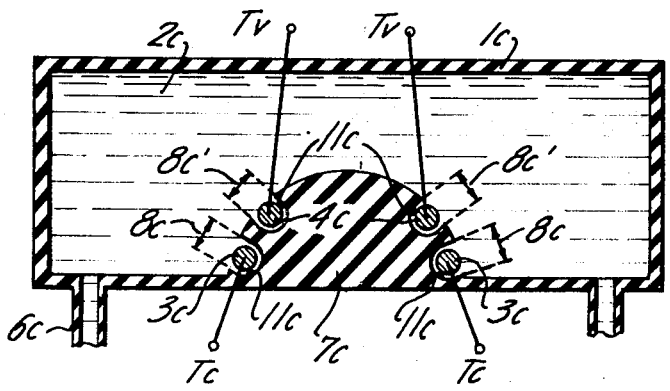

In the embodiment of the measuring cell according to the invention as shown in FIG. 4 a set of current electrodes $3c$ and a set of voltage electrodes $4c$ are inserted in recesses $11c$ provided in the surface of a common electric insulating body $7c$, the distance between the current electrodes $3c$ along the surface being greater than the distance between the voltage electrodes $4c$. In this case the paths of current flow will radiate in fin shape from the apertures $8c$ opposite the recesses which contain the current electrodes $3c$, and all the paths of current flow will therefore bypass the recesses $11c$ containing the voltage electrodes $4c$.

Figure 5:
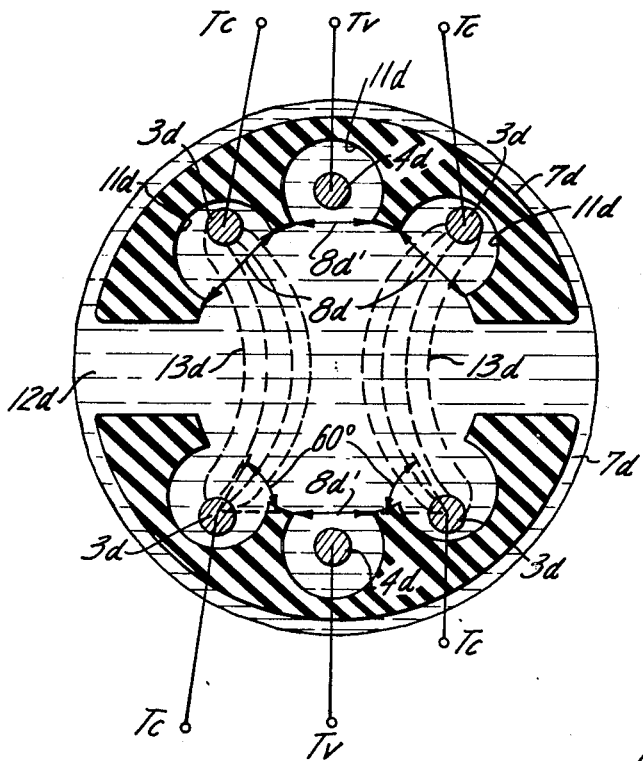

In the embodiment of the measuring cell according to the invention as shown in FIG. 5, the current electrodes $3d$ are inserted in recesses $11d$ provided in the electrically insulating, preferably cylindrical body $7d$ which extends with its longitudinal axis at right angles to the plane of the paper and which may consist of two symmetrical halves $7d$ and $7d'$ with an intervening space $12d$ to ensure access for the electrolytic medium to the current electrodes $3d$ and the voltage electrodes $4d$, all of which are arranged symmetrically in relation to the centerline of the intervening space and inserted in recesses $11d$ provided in the interior surface of the electrically insulating body $7d$. The recesses $11d$ are arranged in such a way that the apertures $8d'$ of recesses $11d$ which house the voltage electrodes $4d$ are located in a plane which forms an angle of 60°—120° with the paths of current emanating from the current electrodes $3d$. FIG. 5 shows schematically some of the paths of current flow $13d$ between the two sets of current electrodes $3d$, the paths radiating through openings $8d$ from the current electrodes, passing openings $8d'$ of the voltage electrodes $4d$ without being able to reach the voltage electrodes $4d$ since apertures $8d'$ are located in a plane forming an angle of 60—120° with the paths of current flowing between the current electrodes $3d$.

Figure 6:
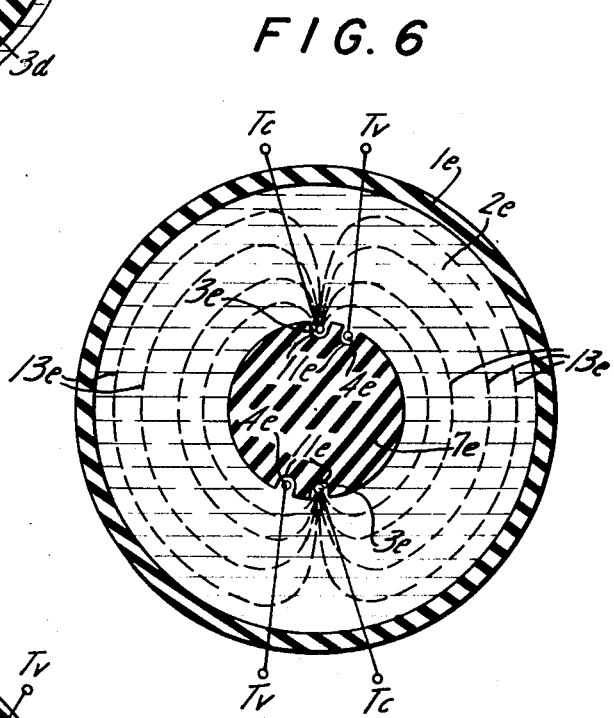

The measuring cell according to the invention as shown in FIG. 6 has a cylindrical cell chamber $1e$ the axis of which is located at right angles to the plane of the paper, and coaxially in the cell chamber $1e$ there is provided an electrically insulating body $7e$ which in its recesses $11e$ accommodates both a set of current electrodes $3e$ and a set of voltage electrodes $4e$. In FIG. 6 some of the current lines $13e$ between the current electrodes $3e$ are illustrated schematically, and as will be seen the voltage electrodes $4e$ are screened off by the body $7e$ in such manner that the paths of current flow bypass the voltage electrodes $4e$.

Figure 7:
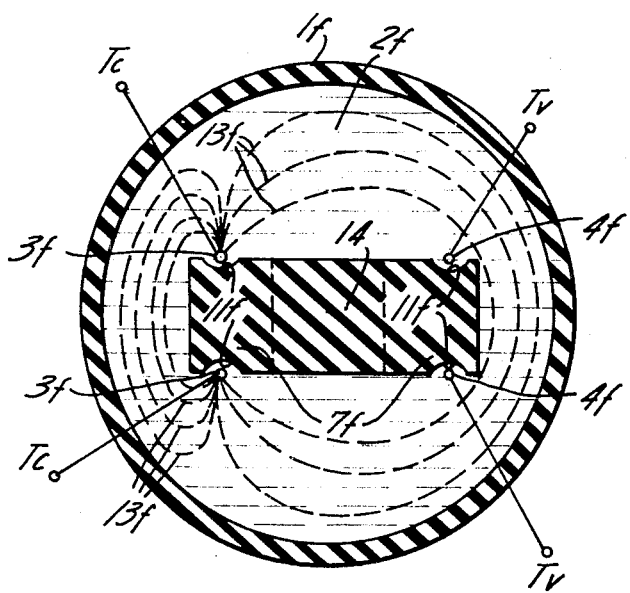

FIG. 7 shows a modification of the measuring cell according to the invention as shown in FIG. 6, the electrically insulating body $7f$ being of substantially rectangular cross section. Current electrodes $3f$ as well as voltage electrodes $4f$ are accommodated in recess $11f$ provided in the outer surface of the body $7f$, and in the figure are schematically indicated some of the paths of current flow between the current electrodes $3f$. Owing to the shape of the cell chamber and of the body $7f$ the current lines bypass the voltage electrodes $4f$. It will be appreciated that the rectangular body $7f$ may be divided into two halves as indicated by a dotted space $14$ without the course of the lines of current being altered.

It will likewise be appreciated by those skilled in the art that even though the minimum secondary polarization and consequently optimal measuring accuracy are obtained by theoretically correct arrangement of the voltage electrodes in relation to the electrically insulating body, smaller displacements of the voltage electrodes out from the theoretically correct location, for example caused by manufacturing tolerances and similar industrial considerations, will not to any essential extent increase the secondary polarization nor reduce the measuring accuracy essentially, provided only that such displacements take place within the areas where the density of the paths of current flow is very low.

What I claim and desire to secure by Letters Patent is:

1. An apparatus for measuring the electrical conductivity of a liquid medium comprising: a cell receptive during use of the apparatus of a liquid medium whose electrical conductivity is to be measured; a plurality of spaced-apart current electrodes disposed in said cell in position to contact the liquid medium; potential applying means for applying an alternating potential between said current electrodes to establish an alternating current flow in the liquid medium along predetermined paths; a current measuring device connected in series with said current electrodes and said potential applying means operable to measure the current flowing between said current electrodes; a pair of voltage electrodes disposed in said cell to contact the liquid medium; bypassing means disposed within said cell for bypassing the current flow around said voltage electrodes to effectively screen said voltage electrodes from said current flow; and means for measuring the potential between said potential electrodes; whereby said liquid conductivity can be established from said measured voltage and said measured current.

2. An apparatus as in claim 1 wherein said bypassing means comprises an electrical insulating material having means therein defining at least two pairs of recesses, said current and voltage electrodes being disposed in the first and second pairs of recess, respectively.

3. An apparatus as in claim 2 wherein each of said recesses has a planar opening, the planar openings of said recesses for said voltage electrodes being disposed at an angle of from 60° to 120° with respect to the path of current flow between said current electrodes.

4. An apparatus as in claim 1 wherein said current electrodes and said voltage electrodes are mounted coaxially with respect to each other.

5. An apparatus as in claim 1 wherein said current electrodes have a configuration in the shape of an annulus and are mounted coaxially around said voltage electrodes.

6. An apparatus as in claim 1 wherein said bypassing means comprises a semicircular cylindrical screen of electrical insulating material disposed substantially coaxially with said voltage electrodes.